June 20, 1967      L. W. TONEY      3,326,147
DESK SCREEN
Filed Oct. 21, 1965      3 Sheets-Sheet 1
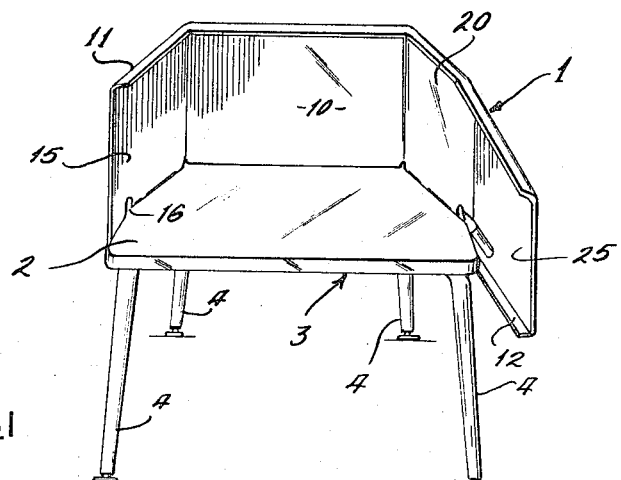
FIG.1
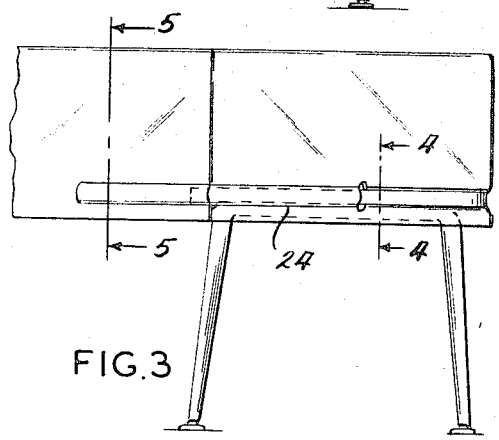
FIG.3
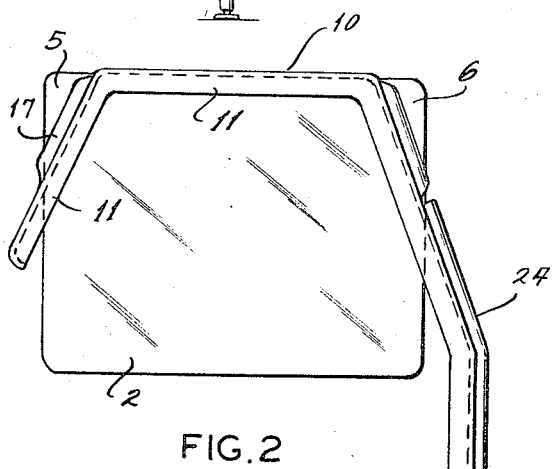
FIG.2
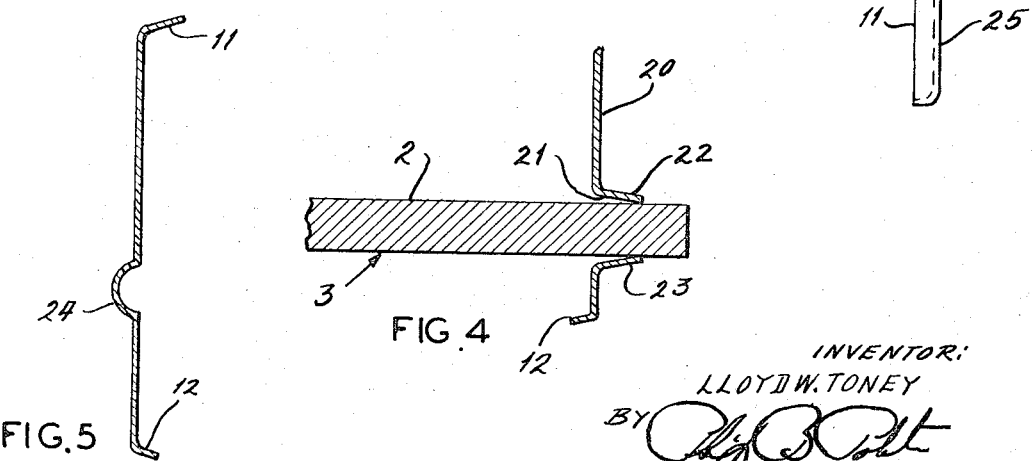
FIG.5      FIG.4
INVENTOR:
LLOYD W. TONEY
BY
ATTORNEY June 20, 1967  L. W. TONEY  3,326,147
DESK SCREEN Filed Oct. 21, 1965  3 Sheets-Sheet 2

INVENTOR:
LLOYD W. TONEY
BY
ATTORNEY

//united States Patent Office 3,326,147
Patented June 20, 1967

3,326,147
DESK SCREEN
Lloyd W. Toney, 7048 Waterman,
University City, Mo. 63130
Filed Oct. 21, 1965, Ser. No. 499,851
14 Claims. (Cl. 108—27)

This invention relates to educational equipment.

There is a long-felt and apparent need in school classrooms for a screen or divider which can be mounted on, and demounted from, conventional school desks, to reduce distraction in those rooms in which different students are occupied with different tasks, to reduce glare in those parts of a room in which direct sunlight may cause a problem, to discourage copying and for various other purposes which will occur to every classroom teacher.

One of the objects of this invention is to provide a device which can be used as a privacy-providing screen or partition, which is readily and easily put into and out of use on conventional school desks.

Another object is to provide such a device which is light, strong and self-supporting.

Another object is to provide such a device which may be sufficiently translucent to provide a diffused but adequate illumination but at the same time to preclude seeing through it.

Still another object is to provide such a device which is sturdy, inexpensive to manufacture, easily cleaned, difficult to deface or injure, safe for use by small children, and easily storable, preferably on the desks.

Other objects will become apparent to those skilled in the art in the light of the following description and accompanying drawing.

In accordance with this invention, generally stated, a screening device is provided which can be put into and out of use on a school desk of conventional design, without modifying the desk, without the use of any tools, by the student or teacher with a minimum of time and disturbance. The device of this invention has a front panel member and two wing members, one of which extends away from the front panel farther than the other and both of which project laterally beyond the side edges of the school desk. The wing members in one embodiment, are provided with slots, adapted to receive two corners of the desk upon which the device is mounted. In another embodiment, the wing members are mounted on side bars of a frame.

In still another embodiment, the wing members are integral with the front panel member and the front panel member alone is mounted on a frame. In these latter two embodiments, at least a long wing member is preferably bent reentrantly intermediate its rearward reach to hug the desk top and clear the aisle between desks.

In both of the illustrative embodiments in which a frame is employed, the screen part is vertically adjustably supported by a stanchion connected to the desk. In the preferred embodiment, the device is made from a plastic material which may be fiber glass-reinforced, and is strengthened by a rib and rims or bar in such a way as to be self-supporting and free standing.

In the drawing, FIGURE 1 is a view in perspective of one illustrative embodiment of device of this invention;

FIGURE 2 is a top plan view of the device shown in FIGURE 1;

FIGURE 3 is a view in side elevation of the device shown in FIGURES 1 and 2;

FIGURE 4 is a sectional view taken along the line 4—4 of FIGURE 3;

FIGURE 5 is a sectional view taken along the line 5—5 of FIGURE 3;

FIGURE 6 is a view in perspective of another embodiment of device of this invention, mounted on a pedestal type desk;

Figure 7:
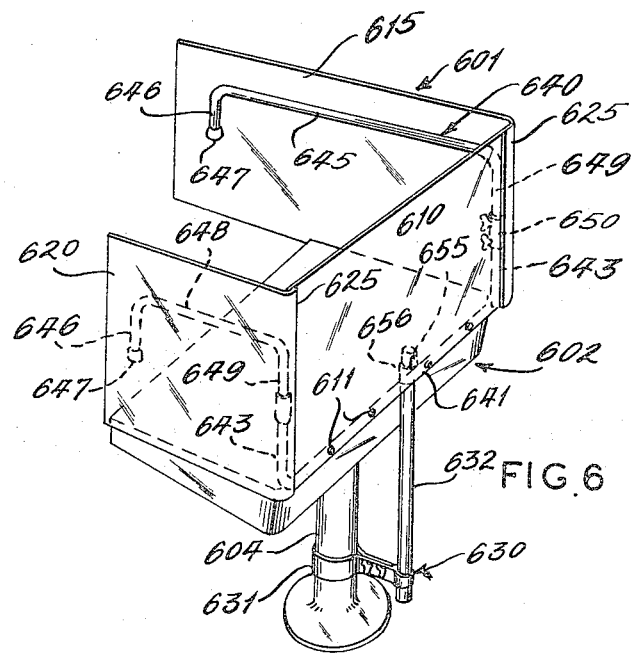
FIGURE 7 is a sectional view revealing a wing, desk and clamping means in side elevation, of still another embodiment.

Referring now to the drawing for one illustrative embodiment of device of this invention, reference numeral 1 indicates a complete screen, which is mounted on a top 2 of a school desk 3. The desk 3 has four legs 4. The desk top 2 has two far corners 5 and 6 which project beyond the reach of the legs 4.

The screen 1 has a front panel 10, a short left wing 15, and a right wing 20. The right wing 20 includes a right wing extension 25. The front panel, left and right wings are all integral, and, in the embodiment shown, are made of one piece of glass fiber-reinforced polyester resin. This material has the requisite spring to enable one to bend the wings outwardly with respect to one another, and to permit a clamping action described hereinafter, and enough rigidity to make the screen sturdily self-standing, when constructed as the screen of this invention is constructed.

The upper edge of the wings, front panel, and extension is formed with an inwardly sloped rim 11. The lower edge of the wings, front panel, and extension is formed with an inwardly sloped rim 12, slightly narrower than the upper rim 11.

A short distance above the lower rim 12, the left wing 15 is provided with a slot 16, parallel with the bottom edge of the wing, and of a width and length to admit the corner 5 of the desk top 2. The top and bottom of slot 16 are defined by upper and lower outwardly flaring flange members 17. The slot 16 extends toward the free end of the left wing, but terminates short of that free edge. On the other end, the slot 16 ends at the bend between the wing 15, and the front panel 10. The flanges 17 at top and bottom of slot 16, are chamfered at their ends, to the plane of the wing, so as to permit them to flex. This arrangement makes the slot 16 at its two ends as wide as the distance between the root of the flanges 17 through the central reach of the slot.

The right wing 20 is also provided with a slot 21, parallel with the bottom edge of the wing and aligned, with respect to the top and bottom edges, with the slot 16 of the left wing 15. The right wing slot 21 is defined top and bottom by upper and lower outwardly flaring flanges 22 and 23, and at its outer end by an end of an outwardly bulged rib 24. The rib 24 is aligned with the slot 21, and extends past the edge of the right wing, into the right wing extension 25, where it terminates short of the free outer edge of the extension. On the other end, the slot 21 terminates at the bend between the right wing 20, and the front panel 10. The flanges 22 and 23 are chamfered at their ends, to the plane of the wing, so as to permit them to flex. This arrangement makes the slot at its two ends as wide as the distance between the root of the flanges 22 and 23 through the central reach of the slot.

The angle of the wings with respect to the front panel is of considerable importance. It has been found that an angle of approximately one hundred five degrees is the optimum angle. The right wing extension is formed at an angle from the right wing of approximately fifteen degrees, so as to make the right wing extension perpendicular to the front panel 10. The right wing extension 25 is of great importance. First, it provides a partition with respect to the seat at the right adjacent the desk on which the screen is mounted. Second, and more importantly it counterbalances and overbalances the weight of the front panel rearwardly. This latter feature is important in this embodiment; it is of equal or greater importance in the other embodiments illustrated and described.

To install the device of this embodiment, it is only necessary to spring the wings outwardly slightly, slip the screen onto the top of the desk so that the corners 5 and 6 project through the slots 16 and 21, and move the device toward the rear edge of the desk (the edge next to which the student will be seated), until the front panel 10 is as close to the edge of the desk as it will come. Preferably, the flange members 17 on one side and 22 and 23 on the other are spaced to grip the desk top lightly between them. The diversion of the wings 15 and 20 from the front panel 10, makes the devices of this embodiment readily stackable.

It is to be noted that the length of the right wing 20 is greater than that of the left wing 17 and that its area is considerably greater than the area of the front panel, so that there is an eccentric weight distribution, rearwardly and to one side. As has been indicated heretofore, this is an important aspect of all embodiments of this invention.

Referring now to FIGURE 6 for another embodiment of device of this invention, a desk 602 is supported by a pedestal 604 on which a mounting bracket 630 is mounted. In this illustrative embodiment, the mounting bracket 630 includes a pedestal clamp 631, which embraces the pedestal 604 and carries, at its projecting end, a stanchion 632, upon which a screen 601 is slidably mounted.

In this illustrative embodiment, the screen 601 includes a front panel 610, a left side panel 615, and a right side panel 620, all supported by a frame 640. The frame 640 is tubular, and includes a front bar 641, a left side bar 642, and a right side bar 648.

The front bar 641 is U shaped, with a central section 642 running along the lower inside edge of the front panel 610, and with two arms 643 extending vertically upwardly from and integrally with the ends of center section 642.

While the frame 640 will ordinarily be made in one piece, for purposes of illustration, in FIGURES 6 and 7, the right and left side bars are shown as connected to the upright arms 643 by means of sleeve couplings 650, with set screws 651, provided to make the frame, hence the screen, easily disassemblable for storage.

Each of the right and left side bars is inverted U shaped, with a rear leg 646 and forward leg 649 projecting vertically downwardly. The forward leg 649 of each side bar is removably mounted in one of the sleeve couplings 650, where it is held by set screw 651. The end of each of the rear legs 646 is finished with a plastic cap 647.

In this embodiment, the front panel 610 is planar and is secured to the front bar 641 by means of rivets 611. The forward edge of each of the left and right side panels is bent to form a lip 625, which is spaced forwardly from the arm 643 and leg 649, and from the coupling 650, in the embodiment shown, to permit the side edge of the front panel 610 to fit snugly between the lip 625 and the vertical members of the tubular frame. The left side panel 615 and right side panel 620 are secured to the left bar 645 and bar 648 respectively by rivets or any other suitable means, except that the outer end of the forward leg 649 is left free to permit the end's being inserted into the connector 650.

In the embodiment shown in FIGURE 6, the dimensions of the frame 640 and the spacing of the stanchion 632 from the desk top are such as to provide clearance for the screen 601 around the entire perimeter of the desk top embraced by the screen. The screen is mounted on the stanchion 632 by means of a simple sleeve 655. In this illustrative embodiment, the sleeve 655 is a female pipe coupling, internally threaded, which fits slidably on the stanchion 632. Merely by way of illustration, the pipe coupling can be a half inch galvanized water pipe coupling and the stanchion, a length of half inch conduit. The difference in dimension of standard pipe and conduit is sufficient to ensure an easy sliding fit, when the two are parallel. The eccentric weight distribution caused by the relatively long span of the long wing, in this embodiment, the left wing 615, however, provides sufficient cocking moment to cause the sleeve 655 to bind on the stanchion 632 and hold the screen in place without the use of a clamping screw or other clamping means.

So that the screen edges are vertical and horizontal when the screen is in use, the sleeve 655 is mounted on the front bar vertically at a slight angle, about 7°, both from the plane of the front panel and from a plane perpendicular to the plane of the front panel, the top of the sleeve being tilted away from the front of the screen and toward the long wing.

The screen may be dropped down below the plane of the desk top simply by rocking the outer ends of the wings slightly upwardly and forwardly, until the mounting sleeve 655 is freed from its bind, which will permit the screen to be lowered to any desired position. At whatever position the screen is to be maintained, it need only be permitted to rock backwardly until the sleeve 655 again binds.

The opposite lower edges of the wings are out of horizontal and the plane of the front panel out of vertical during the up and down movement but are plumb when the wings are rocked back.

Figure 8:
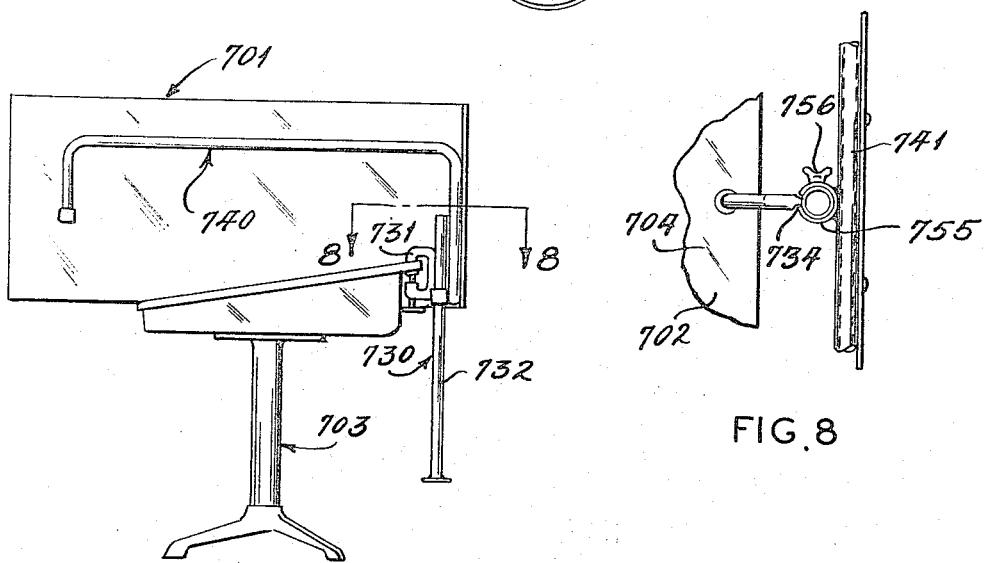
FIGURE 8 is a sectional view taken along the line 8—8 of FIGURE 7.
Figure 9:
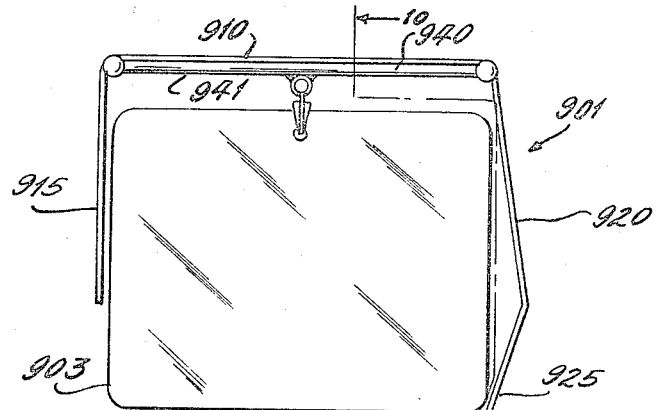
FIGURE 9 is a top plan view of still another embodiment of this invention.

Referring now to FIGURES 7 and 8 for still another embodiment of this invention, a desk 703 is shown with a top 702 which has, along its forward edge, a substantial overhang forwardly of the body of the desk. A bracket 730 including a C-clamp 731 and a stanchion 732, is clamped to the over-hang 704. The stanchion 732 has a stop 733 at its lower end. The screen 701 is identical with the screen 601 except for two respects; first, a frame 740 is made in one piece, without a sleeve coupling, and second, a split ring 755, with a winged set screw 756, is secured to a front bar 741 of the frame 740. The split ring 755 has a passage in its wall just wide enough to pass a spine 734 of the C-clamp member 731 as shown particularly in FIGURE 8.

Even in the embodiment shown in FIGURES 7 and 8, the winged set screw 756 may be omitted. The cocking of the screen due to the unbalanced arrangement of the wings, is sufficient to cause the split ring 755 to bind on the stanchion 732. The height of the screen, i.e. its position on the stanchion 732, can be adjusted in the same way in which the height of the screen 601 was adjusted in the embodiment shown in FIGURE 6.

The screen of this embodiment shown in FIGURES 6–8 can be made of the fiberglass reenforced polyester resin preferred for the embodiment shown in FIGURES 1–5 or polypropylene resin of a thickness on the order of .040″, or polyvinyl chloride resin or any other suitable plastic, as can the other embodiments.

Referring now to FIGURES 9–15 for still another embodiment of screening device of this invention, screen part 901 is made with integral front panel 910 and left and right wings 915 and 920 respectively. The right wing 920 has a right wing extension 925 which is bent slightly reentrantly with respect to a side edge of a desk top 903 so as to hug the desk top edge at its rearward end. A frame 940 is U shaped with a central tubular horizontal bar 941 and two vertical arms 943 integral with the central bar. The central bar extends substantially the full length of the front panel 910 and the arm 943 extend substantially the full height of the panels. For this embodiment of panel, an especially suitable plastic is polyvinyl chloride resin, such as Monsanto Company's "Lustraspan," in sheets about .068″ thick. This material can be formed easily and the wings can be folded in, against the natural bias of the material, for shipping or storage, without detriment. At the same time, such a panel, in the form shown and re-enforced by the frame 940, is self-supporting. It can be had in various colors and degrees of transparency. The frame of this embodiment can be fastened to the front panel either on its front side or its rear side. In the former case, a slot has to be cut in the lower margin of the front panel to admit a mounting sleeve or split ring as the case may be.

Figure 12:
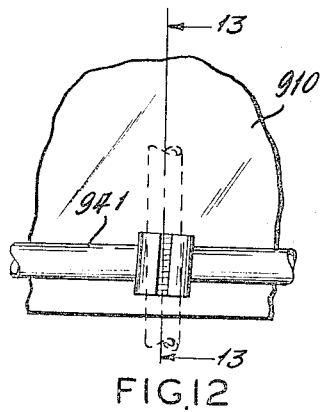
FIGURE 12 is a fragmentary view in rear elevation of a part of the embodiment of device shown in FIGURES 9—11.
Figure 13:
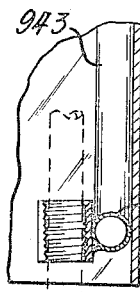
FIGURE 13 is a sectional view taken along the line 13—13 of FIGURE 12.
Figure 11:
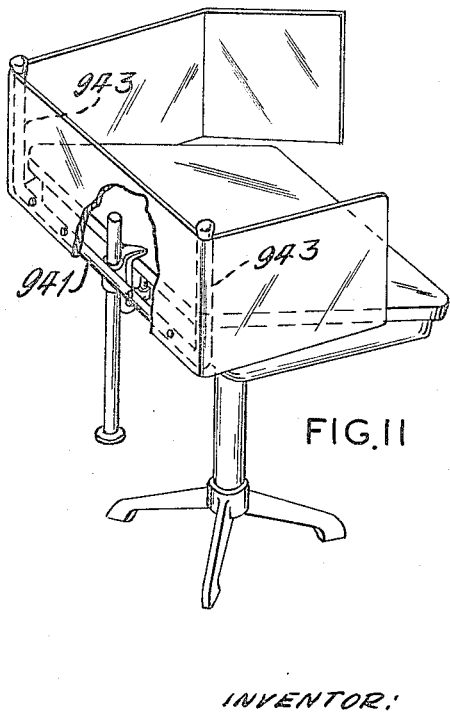
FIGURE 11 is a view in perspective, partly broken away, of the device shown in FIGURES 9 and 10.
Figure 10:
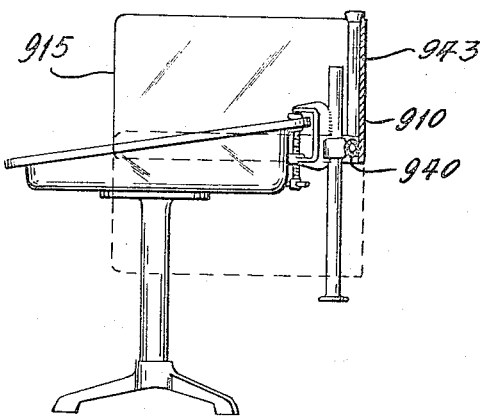
FIGURE 10 is a sectional view taken along the line 10—10 of FIGURE 9.

The inclination of a pipe coupling type split ring 955 is illustrated in FIGURES 12 and 13. The same sort of inclination will be used with a sleeve type, to ensure a "square" position of the screen part when in use, as shown in FIGURE 10.

Numerous variations in the construction of the device of this invention, within the scope of the appended claims, will occur to those skilled in the art in the light of the foregoing disclosure. For example, the panels of the screen part may be provided with shelf-like offsets intermediate their height, which serve both as storage shelves and as re-enforcing and rigidifying ribs. The embodiment of screen shown in FIGURES 1–5 may also be provided with slots, parallel with slots 16 and 21, along the upper edge of the screen, so that the screen may be stored out of use by dropping it to the position at which the front corners of the desk engage the upper slots and the main body of the screen is below the desk top level. A similar construction can be used to make the screen both right and left handed. If desired, the slots can be provided in extensions or ears projecting from the upper and lower edges of the wings. The panels can be made of plastics of various thicknesses, and compositions. The thickness, with the type of construction shown in FIGURES 6 through 8, is preferably on the order of .040 inch, though a range of 0.15 to at least .080 inch, depending upon the type of plastic and degree of translucency desired, can be used. In the embodiments shown in FIGURES 6 and 7, the shape and extent of the frame can be made more nearly complementary to the outline of the panels, and can be made of various materials. A tubular metal frame is light and strong, but a solid frame and frames of different cross sectional configuration can be used. The forward frame bar need not be straight, but may be bowed or angled forwardly, so that the stanchion can be accommodated while the outer ends of the front panel are closer to the desk than would be the case when the front panel bar is straight.

If a frame is used in which an upper and lower forward frame bar are provided, two mounting sleeves or rings can be used, making the screen reversible for left or right hand use. More than one post may be used for a stanchion, although a single post is preferred. The mounting sleeve can be modified, as, for example, by making it of a conduit fitting with a screw collar which, when tightened contracts a split or castelated ring about the stanchion post, or by inserting a leaf spring on one side to provide constant bias of the sleeve against the post. The pedestal clamp bracket of the embodiment shown in FIGURE 6 can be, and preferably is made of two heavy straps, joined by bolts with wing nuts, so that the bracket can easily be disassembled and removed entirely from the desk, but it is clear that other arrangements can be had, including a permanently secured bracket. While, in the embodiment of screen illustrated in FIGURES 6–8, rivets have been suggested as the means for mounting the panels to the frame, it can be seen that various types of clips can be secured to the panels, whereby the panels can be demountably attached to the frame. The panels of that embodiment may also be made unitary, and if they are demountably attached to the frame, may be made either rigidly unitary or may be provided with integral hinges at the meeting lines of the panels. Certain plastics, such as polypropylene, lend themselves to such integral hinging. In a more rigid plastic, it may be desirable to use the types of joints common in sheet metal work, either making the joints integral with the edge of the plastic, or securing along the edge of the plastic a formed metal strip. Although plastic is the preferred material, other materials may be used for the screen part. For example, louvered metal window screening, which is available commercially and can be formed in the appropriate shape for the screen part, gives privacy, admits diffused light, and also admits air. Other methods of attachment of the screen part of the device to the desk, as by clips or U-shaped brackets connected to the inside surface of the panels may be used, provided that the cocking of the screen, by virtue of its deliberately unbalanced construction, is utilized. For use with a stanchion, a screen may be provided in which the mounting and the clamping function is performed by a channel or sleeve-defining shape made integral with the forward panel, which can be made of a boxed wall construction to give the necessary rigidity. These variations, of the type which will occur spontaneously to those skilled in the art in the light of the disclosure, are merely illustrative.

Having thus described the invention, what is claimed and desired to be secured by Letters Patent is:

1. In combination with a school desk with a front edge, side edges and a rear edge next to which a student sits, a desk screen device comprising connected front and side panels, one of said side panels being longer than the other and having an area at least as great as the area of the front panel and means for mounting said desk screen device on said desk with the front panel forward of the front edge of said desk and the long side panel extending along and beyond a side edge of said desk and being unsupported through a substantial distance from its free end, whereby the said device is eccentrically unbalanced with respect to the front panel.

2. The desk screen device of claim 1 wherein the front and side panels are integral.

3. The desk screen device of claim 2 wherein the mounting means comprise slot defining flanges, located adjacent the front panel and integral with said side walls and adapted to embrace corner areas of the desk top.

4. The desk screen device of claim 3 wherein a rib, integral with the said side panel, extends parallel with a long edge of the long side panel.

5. In combination with a school desk having a front edge, side edges, and a rear edge next to which a student sits, a desk screen device comprising connected front and side panels, one of said side panels being longer than the other and having an area at least as great as the area of the front panel, and means for mounting said desk screen device on said desk with the front panel forward of the front edge of said desk and the long side panel extending along and beyond a side edge of said desk, said mounting means comprising a stanchion mounted on said desk and a sleeve slidably mounted on said stanchion and fixed relative to the said front panel.

6. The desk screen device of claim 5 wherein the desk is provided with a pedestal and the mounting means include a pedestal-embracing mounting bracket, said stanchion being supported by said mounting bracket.

7. The desk screen device of claim 5 wherein the desk has a top with a forward margin of sufficient extent to mount a clamp and the mounting means include a C-clamp secured to and carrying the said stanchion.

8. The desk screen device of claim 6 wherein the said sleeve is continuous circumferentially.

9. The desk screen device of claim 7 wherein the said sleeve is slotted axially to pass a spine of said C-clamp.

10. The desk screen device of claim 5 wherein the front panel is mounted on a U-shaped frame and the sleeve is mounted on a center bar section of said frame.

11. The desk screen of claim 10 wherein the front panel is planar through its central span, the center bar section of the frame is substantially horizontal and the sleeve is mounted at an angle from the vertical with respect to the plane of the front panel in a direction away from the panel in an upward direction.

12. A desk screen device mounted on a school desk with a front edge, side edges and a rear edge next to which a student sits, said device comprising a stanchion fastened to said desk; said stanchion having a substantially vertical post, and a screen part slidably mounted on said post, said screen part comprising integral front and side panels of translucent plastic, the area of said side panels being greater than that of the front panel and both panels extending and being positioned beyond the side edges of said desk, a U-shaped frame, means for mounting said front panel on said frame, and desk screen mounting means on said frame slidably embracing said stanchion post.

13. The device of claim 12 wherein the desk screen mounting means is an internally threaded sleeve.

14. The device of claim 3 wherein two sets of slot defining flanges are carried by each side panel, one near its lower edge and one near its upper edge, whereby the screen part can be mounted for storage on the desk with the bulk of the screen below the top surface of the desk.

References Cited

UNITED STATES PATENTS

| | | | |
|---|---|---|---|
| 1,683,007 | 9/1928 | Ziemmerman | 108—27 |
| 2,673,132 | 3/1954 | Alderman | 312—239 X |
| 2,961,280 | 11/1960 | Jenzten | 108—27 |
| 3,054,651 | 9/1962 | King | 312—239 |
| 3,085,843 | 4/1963 | Mallina | 312—239 |
| 3,152,848 | 10/1964 | Kalk | 312—241 |
| 3,211,506 | 10/1965 | Levy | 312—239 |

CHANCELLOR E. HARRIS, *Primary Examiner.*